United States Patent [19]

Murase et al.

[11] Patent Number: 4,859,401
[45] Date of Patent: Aug. 22, 1989

[54] NUCLEAR REACTOR

[75] Inventors: Michio Murase, Mito; Yoshiyuki Kataoka, Naka; Hisamichi Inoue, Takahagi; Masanori Naioh; Toshihiko Sugisaki, both of Hitachi, all of Japan

[73] Assignee: Hitachi, Ltd., Tokyo, Japan

[21] Appl. No.: 896,256

[22] Filed: Aug. 14, 1986

[30] Foreign Application Priority Data

Aug. 14, 1985 [JP] Japan ................. 60-177522

[51] Int. Cl.$^4$ .......................................... G21C 15/18
[52] U.S. Cl. ................................. 376/282; 376/299; 376/307
[58] Field of Search ............... 376/282, 283, 298, 299, 376/307, 406

[56] References Cited

U.S. PATENT DOCUMENTS

| | | | |
|---|---|---|---|
| 3,060,110 | 10/1962 | Wainrib | 376/307 |
| 3,114,414 | 12/1963 | Judd | 376/307 |
| 3,245,881 | 4/1966 | Ammon et al. | 376/299 |
| 3,346,459 | 10/1967 | Prince et al. | 376/282 |
| 3,816,245 | 6/1974 | Bevilacqua | 376/282 |
| 3,976,834 | 8/1976 | Bevilacqua | 376/282 |
| 3,977,940 | 8/1976 | Frisch | 376/282 |
| 3,981,770 | 9/1976 | Middleton | 376/282 |
| 4,046,626 | 9/1977 | Winkler et al. | 376/282 |
| 4,064,002 | 12/1977 | Desmarchais et al. | 376/282 |
| 4,072,560 | 2/1978 | Seidelberger | 376/282 |
| 4,571,323 | 2/1986 | Costes | 376/299 |
| 4,702,879 | 10/1987 | Tower et al. | 376/282 |

FOREIGN PATENT DOCUMENTS

| | | | |
|---|---|---|---|
| 812450 | 5/1969 | Canada | 376/283 |
| 2193233 | 2/1974 | France | |
| 2314559 | 1/1977 | France | |
| 50-43396 | 4/1975 | Japan | |
| 53-51395 | 5/1978 | Japan | |
| 54-69695 | 6/1979 | Japan | |
| 951896 | 3/1964 | United Kingdom | 376/307 |
| 1178380 | 1/1970 | United Kingdom | |

Primary Examiner—Deborah L. Kyle
Assistant Examiner—Richard W. Wendtland
Attorney, Agent, or Firm—Antonelli, Terry & Wands

[57] ABSTRACT

The emergency core cooling structure according to the present invention is provided with a water storage container which holds therein emergency cooling water to be supplied to a core region in a nuclear reactor in case of an emergency, for example, when the primary cooling water flows out from a reactor vessel, so as to maintain the temperature of the emergency cooling water in the upper portion of the water storage container in a level higher than the level of that of the emergency cooling water in the lower portion thereof, the lower portion of the water storage container, which is filled with the low-temperature cooling water, being communicated at all times with the core of the nuclear reactor by a means which has substantially no movable member. When the primary cooling water flows out, so that the pressure in a reactor vessel decreases, the emergency cooling water in the high-temperature region is boiled to expand to cause the low-temperature emergency cooling water in the lower portion of the water storage container to be raised, the resultant low-temperature emergency cooling water being supplied to the core region.

8 Claims, 14 Drawing Sheets

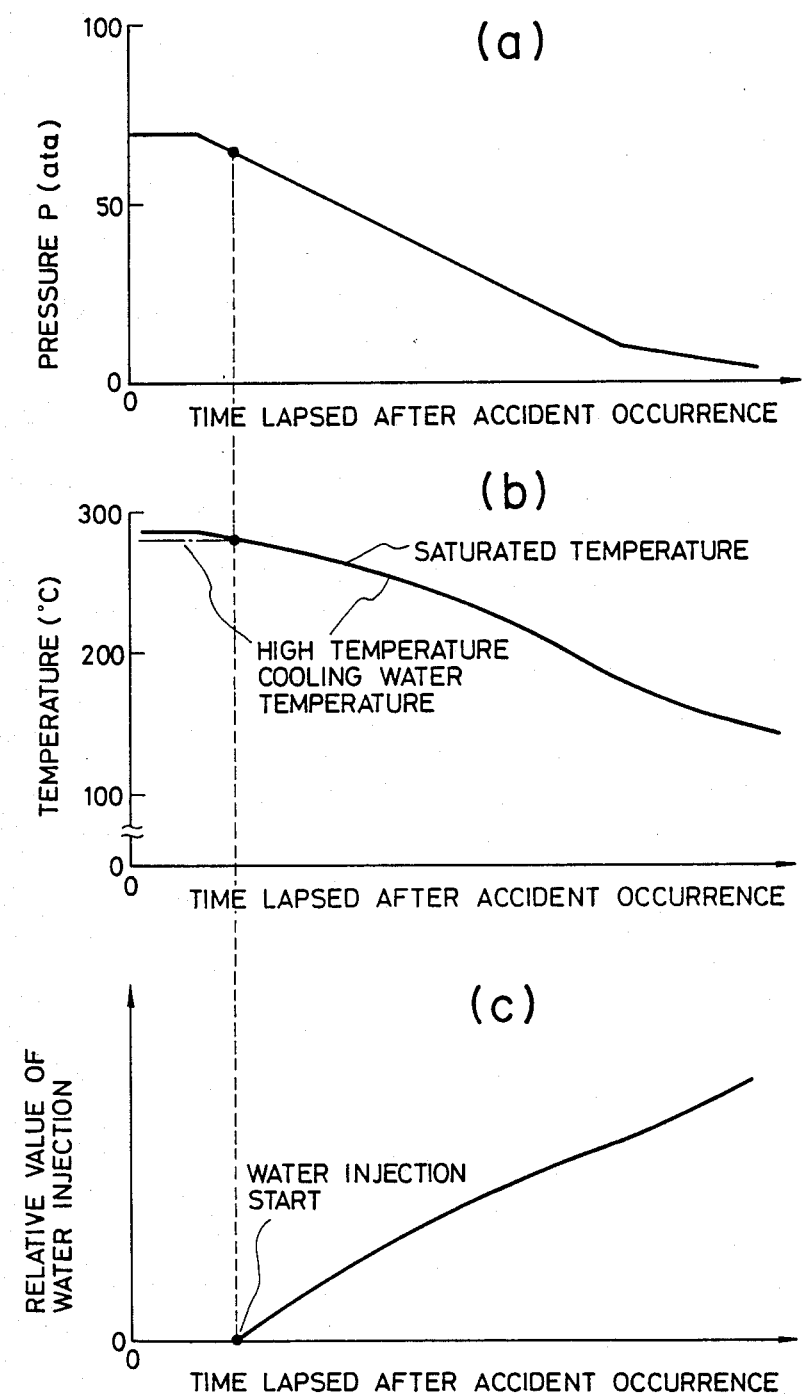

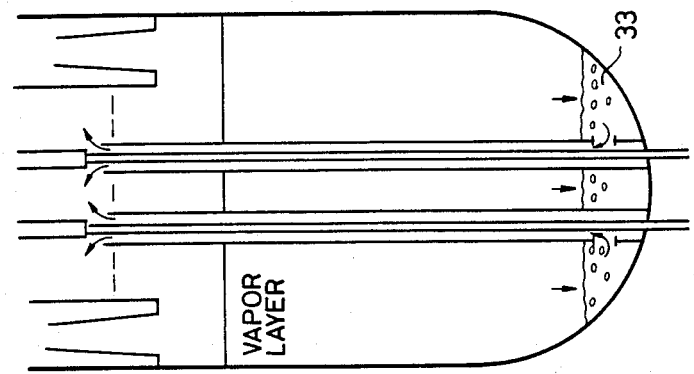
FIG. 5c — FINAL STAGE OF WATER INJECTION
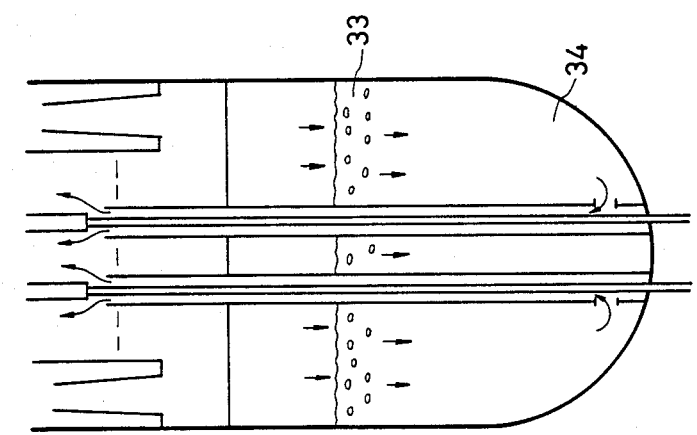
FIG. 5b — INTERMEDIATE STAGE OF WATER INJECTION
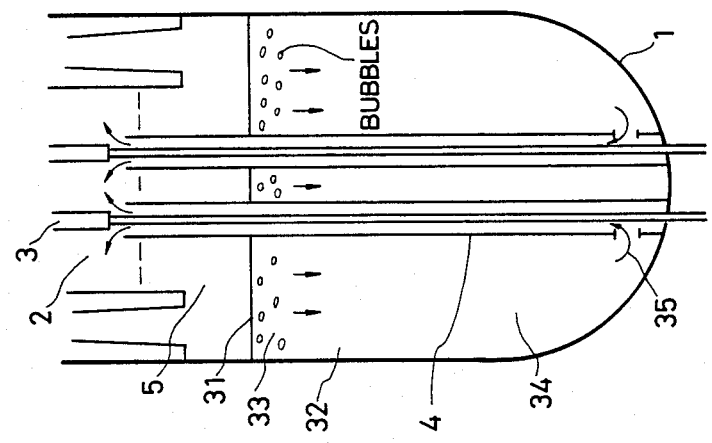
FIG. 5a — AT TIME OF WATER INJECTION START

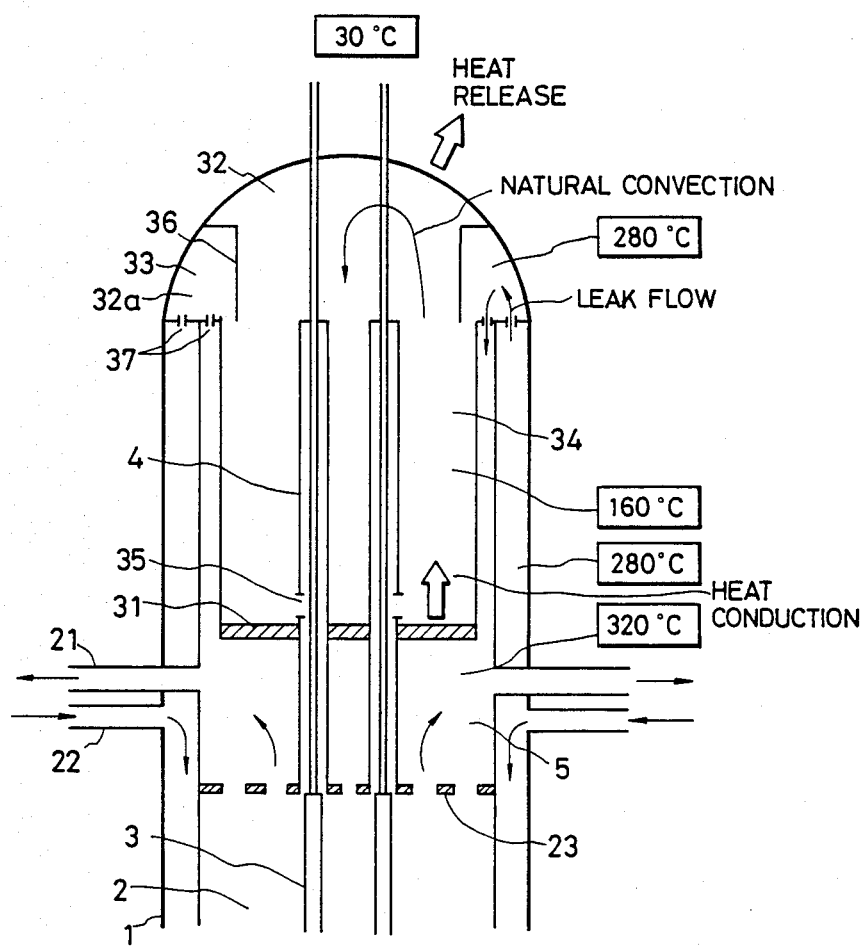

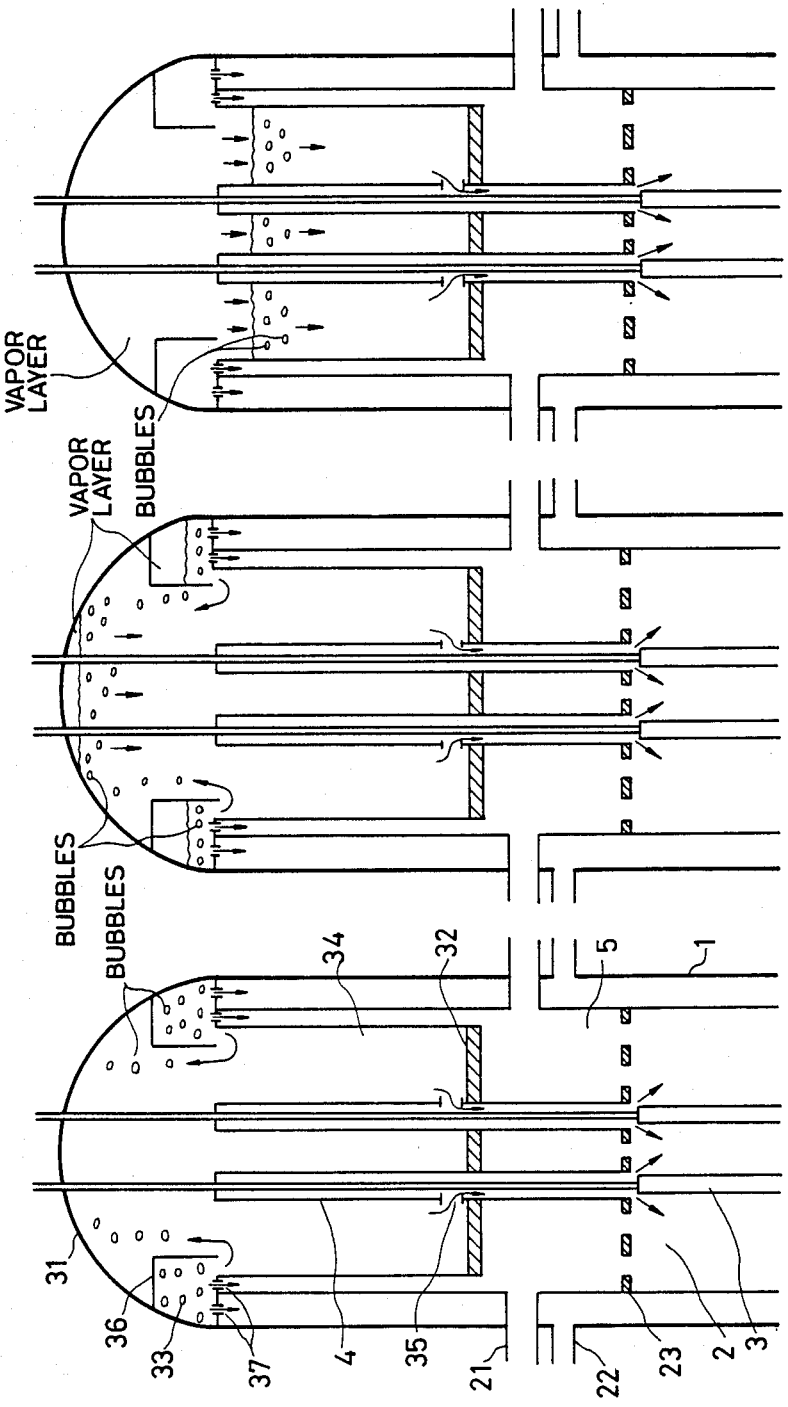

NUCLEAR REACTOR

BACKGROUND OF THE INVENTION

This invention relates to a nuclear reactor having an emergency core cooling structure used to cool a core when an accident occurs in the nuclear reactor.

A conventional emergency core cooling structure has in general a driving means, such as a pump and a valve. Such an emergency core cooling structure requires to be provided with a plurality of independent systems taking an accident to an accessory machine into consideration. This causes the dimensions of the equipment to excessively increase. As disclosed in Japanese Patent Laid-Open No. 51395/1978, the techniques for simplifying the construction of an emergency core cooling structure have been proposed, in which the emergency cooling water stored in a tank which is provided in a reactor vessel is injected into a core in an emergency by utilizing a difference between the pressures in the tank and core. According to such techniques, only a check valve is required as a driving means but, in these techniques, no consideration is given to the cooling water storage capacity and the core cooling performance. A reactor vessel contains various kinds of in-pile structures, and has a limited space in which a tank can be installed. If the reactor vessel is enlarged so as to install a tank therein, the manufacturing cost increases. If a tank is installed in the reactor vessel, the cooling water in the tank thermally equilibrates the primary coolant in the reactor vessel, and the temperature of the cooling water in the tank becomes equal to that of the primary coolant. Consequently, when the cooling water in the tank is injected into the core, it is boiled under vacuum and supplied in the form of vapor to the core, so that the core cooling effect of the cooling water becomes small.

SUMMARY OF THE INVENTION

An object of the present invention is to obtain a nuclear reactor having an emergency core cooling structure provided with no driving means, such as a pump and a valve and having a high reliability and a high core cooling effect.

To achieve the above object, the present invention is provided with a liquid storage container holding an emergency cooling liquid which is supplied to a core region of a nuclear reactor in an emergency including an occasion on which an outflow of the primary cooling water from the reactor vessel occurs, and the temperature of the portion of the emergency cooling liquid which is in the upper portion of the interior of the storage container is kept higher than that of the portion of the emergency cooling liquid which is in the lower portion of the interior thereof, the lower portion, which contains the low-temperature emergency cooling liquid, of the liquid storage container and the core region of the nuclear reactor being connected at all times by a means which has substantially no movable portion. When the primary cooling water flows out to cause the pressure in the reactor vessel to decrease, the emergency cooling water in the high-temperature temperature region is boiled and expanded owing to the above-described arrangement to thereby press down the emergency cooling liquid in the low-temperature region in the lower portion of the liquid storage container. This low-temperature emergency cooling liquid is necessarily supplied to the core region.

According to the present invention, the expansion force, which occurs when the emergency coolant in the high-temperature region is flashed, i.e. a force generated on the basis of the natural law is used as a driving power source for supplying a low-temperature emergency coolant to a core. This enables a driving means to be omitted, and a highly-reliable emergency core cooling structure to be obtained. This structure according to the present invention as a structure for supplying a low-temperature emergency coolant to the core enables the improvement of its core cooling effect.

According to the present invention, the core cooling is promoted by increasing the temperature of the emergency coolant in the high-temperature region to not lower than 210° C. so that the low-temperature emergency coolant can be supplied to the core at not lower than 20 ara (atm absolute) at which the core is exposed, and the temperature of the low-temperature emergency coolant is set to not higher than 180° C. so as to prevent the low-temperature emergency coolant from being flashed during the injection of the coolant into the core.

According to the present invention, a partition is provided in, for example, the reactor vessel to form a water storage container by a part of the reactor vessel and this partition, and a part of the emergency coolant in the water storage container is heated to a high temperature by using the primary coolant in the reactor vessel as a heat source, the greater part of the emergency coolant in the water storage container being maintained at a low temperature by the radiation of heat from the reactor vessel. Therefore, the dimensions of an additional constructed means as the emergency core cooling structure can be minimized, and a nuclear reactor having an inexpensive emergency core cooling structure can be obtained.

BRIEF DESCRIPTION OF THE DRAWINGS

FIGS. 2–5 illustrate the principle of the present invention shown in FIG. 1, wherein:

FIG. 2 is a diagram showing the temperatures of a primary coolant and a coolant in a water storage container during a normal operation of a nuclear reactor;

FIG. 3 is a graph illustrating the magnitude of the expansion of the cooling water, which occurs due to the flashing thereof;

FIG. 4 is a graph showing a decrease in the pressure in a reactor vessel after an accident occurring in the nuclear reactor, and a decrease in the saturation temperature and an increase in the rate of injection of the low-temperature cooling water into a core, which are caused by this pressure decrease; and FIGS. 5a–5c are schematic sections showing the condition of the interior of the water storage container in the initial, intermediate and final stages, respectively, of the injection of the cooling water into the core.

FIGS. 7 and 8a–8c illustrate the operation of the embodiment of FIG. 6, wherein:

FIG. 7 is a schematic section showing the condition of the interior of a water storage container during a normal operation of the nuclear reactor; and FIGS. 8a-8c are schematic sections illustrating the condition of the injection of cooling water after an accident occurring in the nuclear reactor.

DESCRIPTION OF THE PREFERRED EMBODIMENTS

Figure 1:
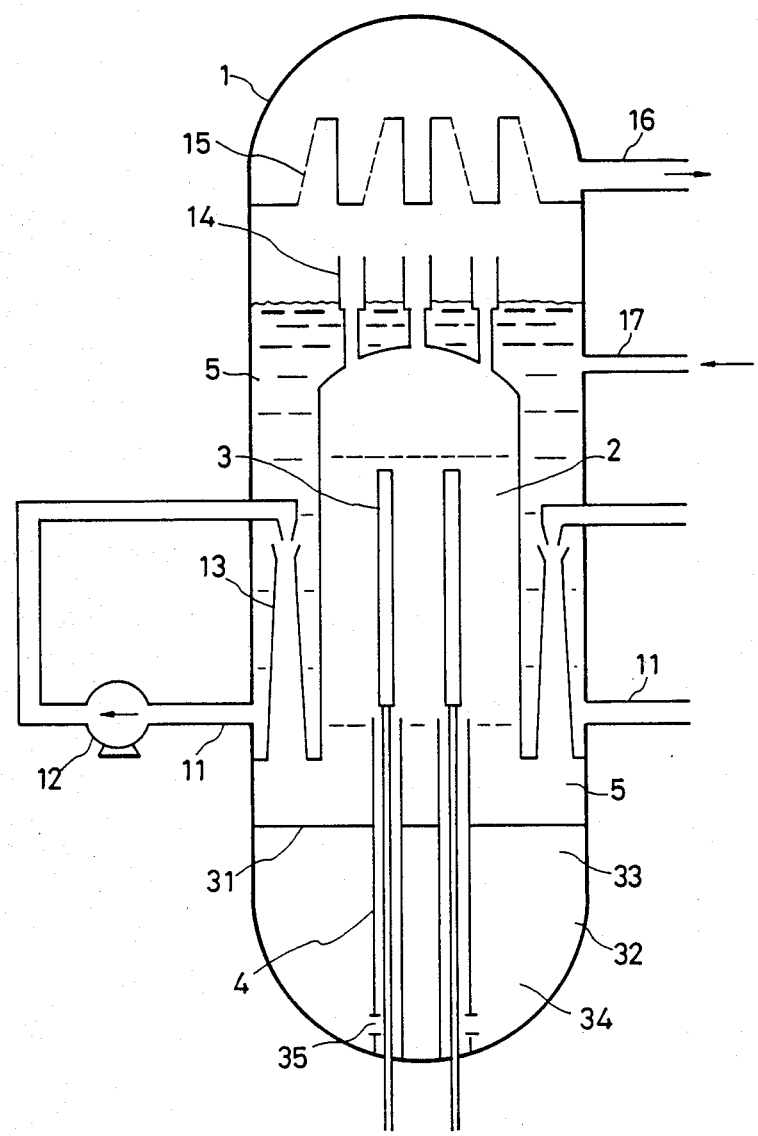
FIG. 1 is a schematic longitudinal section of a first embodiment of the present invention.

The present invention will now be described in detail on the basis of the embodiments thereof.

A first embodiment of the present invention in which the present invention is applied to a boiling water reactor will be described with reference to FIG. 1. During a regular operation of a boiling water reactor, a primary coolant 5 is supplied to a core 2 through recirculation pipes 11, a recirculation pump 12 and a jet pump 13. The primary coolant 5 boiled in the core 2 is subjected to gas-liquid separation in a gas-liquid separator 14 and then turned into superheated vapor in a drier 15. The superheated vapor is supplied to a turbine through a main vapor pipe 16 and condensed in a condenser. The resultant primary coolant is supplied to the interior of a reactor vessel 1 through a feed water pipe 17.

Assume that a recirculation pipe 11 is broken to cause a loss of the coolant. The primary coolant 5 in the reactor vessel 1 flows out from the rent in the pipe, so that the water level and pressure in the reactor vessel 1 decrease. When such an accident occurs, control rods 3 are inserted into the core 2. As a result, the nuclear reactor is stopped, and the calorific power in the core 2 rapidly decreases. However, the generation of heat in the core continues due to the decay heat. A means for cooling the core when such an accident occurs is an emergency core cooling structure. Referring to FIG. 1, the emergency core cooling structure is provided with a partition 31 in the reactor vessel 1, and a water storage container 32 is formed by a part of the reactor vessel 1 and partition 31. The primary coolant 5 in the reactor vessel 1 has a high temperature of about 280° C., and, owing to the heat transmitted through the partition 31, the cooling water in the upper portion of the interior of the water storage container 32 is heated, so that a high-temperature emergency coolant 33 is formed. On the other hand, the emergency cooling water in the lower portion of the water storage container 32 is maintained at a low temperature due to the low heat conductivity of the cooling water and the radiation of heat from the portion of the reactor vessel 1 which is used also as the water storage container 32, so that a low-temperature emergency coolant 34 is formed. When an accident referred to previously occurs in the nuclear reactor, the pressure in the reactor vessel 1 decreases to cause the high-temperature coolant 33 in the upper portion of the water storage container 32 to be flashed and expanded. Owing to the expansion force generated during this time, the low-temperature coolant 34 in the lower portion of the water storage container 32 is supplied from outlet ports 35, which are provided at the lower portions of control rod guide pipes 4 to the core 2 through the same pipes 4. During this time, the core 2 is exposed before the pressure in the reactor core 1 has decreased to 20 ata., and the temperature of the fuel rods increases. Even when the coolant is injected into the core after the temperature of the fuel rods have increased to a high level, the coolant is repelled on the outer surfaces of the fuel rods, so that the cooling effect markedly decreases. In this embodiment, the temperature of the high-temperature coolant 33 is set to not lower than 290° C. to enable the injection of the low-temperature coolant 34 to be done before the 20 ata., at which the core 2 is exposed, has been attained. The important points of this embodiment will now be described. (1) The heat source for heating the high-temperature coolant 33 is preferably provided in the upper portion of the water storage container 32. If the heat source is provided in the lower portion of the water storage container 32, the temperature of the cooling water in the water storage container becomes uniform due to the natural convection occurring therein. (2) It is recommended that the outlet ports 35 for the cooling water in the water storage container 32 be provided at the lower portions of the water storage container 32. If the outlet ports are provided at the upper portions of the water storage container 32, the flashed and expanded high-temperature coolant 33 is turned into vapor, which is supplied naturally to the core 2, so that the capability of the emergency core cooling structure for cooling the core 2 lowers. (3) It is most effective to provide the water storage container 32 in a region including the control rod guide pipes 4. During a regular operation of the nuclear reactor, the control rods 3 is withdrawn from the core 2, and the height of the control rod guide pipes 4 has to be not smaller than that of the core 2. In the greater part of the space under the core 2, the primary coolant 5 stays and is not effectively utilized. Moreover, it is necessary when an accident occurs that the space under the core 2 be filled with the coolant before the core 2 has been filled with the cooling water. Therefore, it is necessary to supply extra emergency core cooling water. The volume of the space under the core 2 is about 100 m$^3$, and about 70%, i.e. about 70 m$^3$ thereof can be utilized effectively as the water storage container 32. The control rod guide pipes 4 are communicated with the core 2, and this enables the omission of a special pipe for supplying the cooling water from the water storage container 3 to the core 2.

This embodiment has the following effects.

(1) As much as about 70 m$^3$ of emergency core cooling water can be stored by merely providing the partition in the reactor vessel, and an inexpensive emergency core cooling structure can be provided.

(2) The formation of the high-temperature coolant based on the conduction of heat through the partition 31, the formation of the low-temperature coolant 34 based on the radiation of heat from the reactor vessel 1 which forms the water storage container, the supplying of the low-temperature coolant 34 to the core 2 by the expansion force generated due to the flashing of the high-temperature coolant 33 which occurs due to a decrease in the pressure in the reactor vessel when an accident occurs are all carried out by utilizing phenomena occurring in accordance with the natural law, in which an operation of any driving means is not required. Since a driving means, such as a pump and a valve is not employed, a highly-reliable emergency core cooling structure can be obtained.

The principle of the present invention will now be described with reference to FIGS. 2-5.

Figure 2:
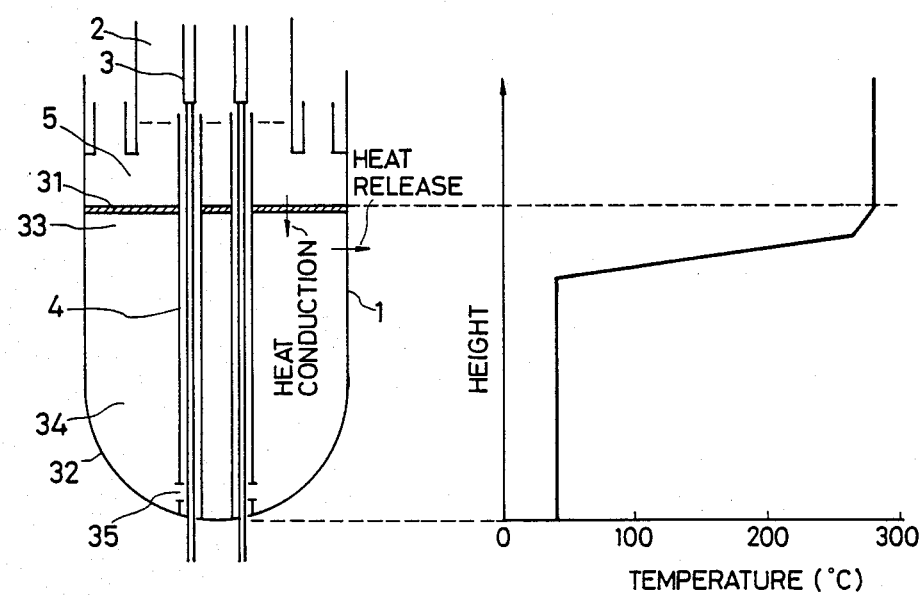

FIG. 2 shows the temperatures of the primary coolant 5, and the high-temperature coolant 33 and low-temperature coolant 34 in the water storage container 32 during a regular operation of the nuclear reactor. The temperature of the primary coolant 5 is about 280° C. The cooling water in the upper portion of the interior of the water storage container 32 is heated by the heat transmitted from this primary coolant 5 and through the partition 31. During this time, the heat transfer resistance of the partition 31 can be neglected since the heat conductivity of the metal constituting the partition is 40 kcal/mh°C. which is 80 times as high as that of 0.5 kcal/mh°C. of the cooling water, and the temperature of the cooling water in the upper end portion of the interior of the water storage container 32 is substantially 280° C. The pressure of the cooling water of 280° C. which starts being boiled is 65 ata., which is higher than 20 ata. at which the core is exposed, which enables the cooling water to be injected into the core. The density of the cooling water of 280° C. is 750 kg/m$^3$. Since this density is lower than that of 990 kg/m$^3$ of the low-temperature coolant 33 in the lower portion of the interior of the water storage container, the high-temperature coolant 33 stays in the upper portion of the interior thereof. Since the heat conductivity of the cooling water is low as described above, the rate of transmission of heat from the high-temperature coolant 33 to the low-temperature coolant 34 is low, and the greater part of the heat transmitted from the primary coolant 5 to the high-temperature coolant 32 is discharged from the side wall of the portion of the reactor vessel which is used also as the water storage container 32. Accordingly, the cooling water in the lower portion of the water storage container 32 is maintained at 40°-50° C. and forms the low-temperature coolant 34.

Figure 3:
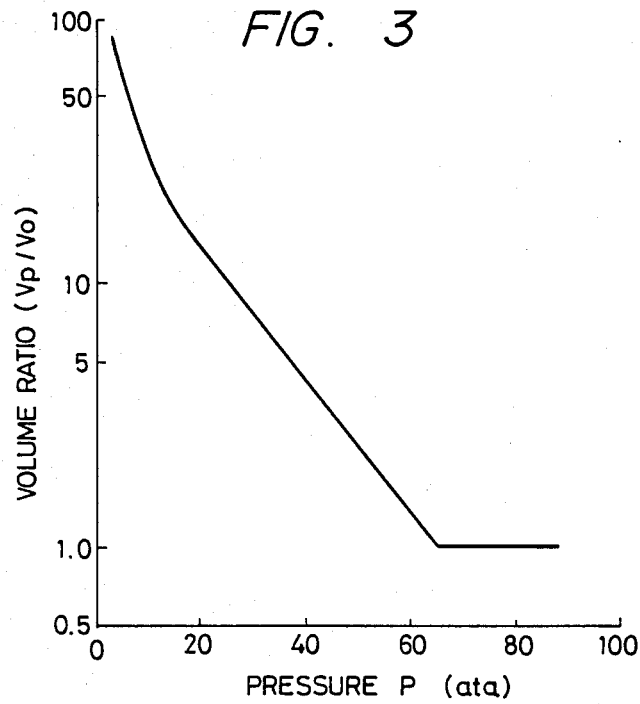

According to the present invention, the expansion force generated when the high-temperature coolant 33 is flashed is used as the driving power source for supplying the low-temperature coolant 34 to the core 2. FIG. 3 shows the relation between the pressure and volume ratio of the high-temperature coolant 33 of 280° C. The saturation pressure of the cooling water of 280° C. is 65 atm. Therefore, this cooling water is not boiled at a pressure of not lower than 65 ata., and the volume Vp thereof is equal to the initial volume Vo, the volume ratio (Vp/Vo) being 1. When the pressure is not higher than 65 atm., the cooling water is flashed. When the pressure is 50 ata., (Vp/Vo)=2.5, and, when the pressure is 30 ata., (Vp/Vo)=7.3. Namely, the volume Vp increases in inverse proportion to the pressure Since the expansion of the cooling water due to the flashing thereof is large as shown in FIG. 3, only a small part of the cooling water in the water storage container may be heated to a high temperature When an accident occurs in the nuclear reactor, the pressure in the reactor vessel decreases as shown in FIG. 4 (see FIG. 4a), due to the outflow of the primary coolant from the reactor vessel, and the saturation temperature also decreases (see FIG. 4b) as the pressure in the reactor vessel decreases. When the high-temperature cooling water has attained the saturation temperature, it starts being boiled, and the temperature thereof decreases along the saturation temperature as the cooling water is boiled. During this time, the high-temperature cooling water expands in accordance with the relation between the pressure and volume ratio shown in FIG. 3, and the low-temperature cooling water is injected into the core by the expansion force thus generated. Since the volume of the high-temperature cooling water increases substantially exponent-functionally due to a decrease in the pressure, the injection rate, which is equal to the volume variation rate, of the low-temperature cooling water increases in proportion to the decrease in the pressure (see FIG. 4c).

FIG. 5a shows the condition of the interior of the water storage container 32 in an initial stage of the injection of the cooling water, FIG. 5b the condition of the interior thereof in an intermediate stage of the injection of the cooling water, and FIG. 5c the condition of the interior thereof in a final stage of the injection of the cooling water. At the injection starting time, an expansion force equal to a difference between the volume of 30 l/kg (at a pressure of 65 ata.) of bubbles generated due to the flashing of the cooling water and the volume of 1.3 l/kg (at a pressure of 65 ata.) of the cooling water is generated. During the injection of the cooling water, the bubbles generated are collected in the upper portion of the interior of the water storage container 32 to form a vapor layer, and the expansion of the high-temperature cooling water due to the reduction of the pressure of the vapor, a compressible fluid, constitutes the main part of the reaction. Accordingly, as the pressure decreases to cause the volume of the vapor layer to increase, the volume ratio becomes high as shown in FIG. 3, and the injection rate of the low-temperature cooling water also increases as shown in FIG. 4. The injection of the low-temperature cooling water is completed when the whole of the cooling water has finished being supplied to the core.

Figure 6:
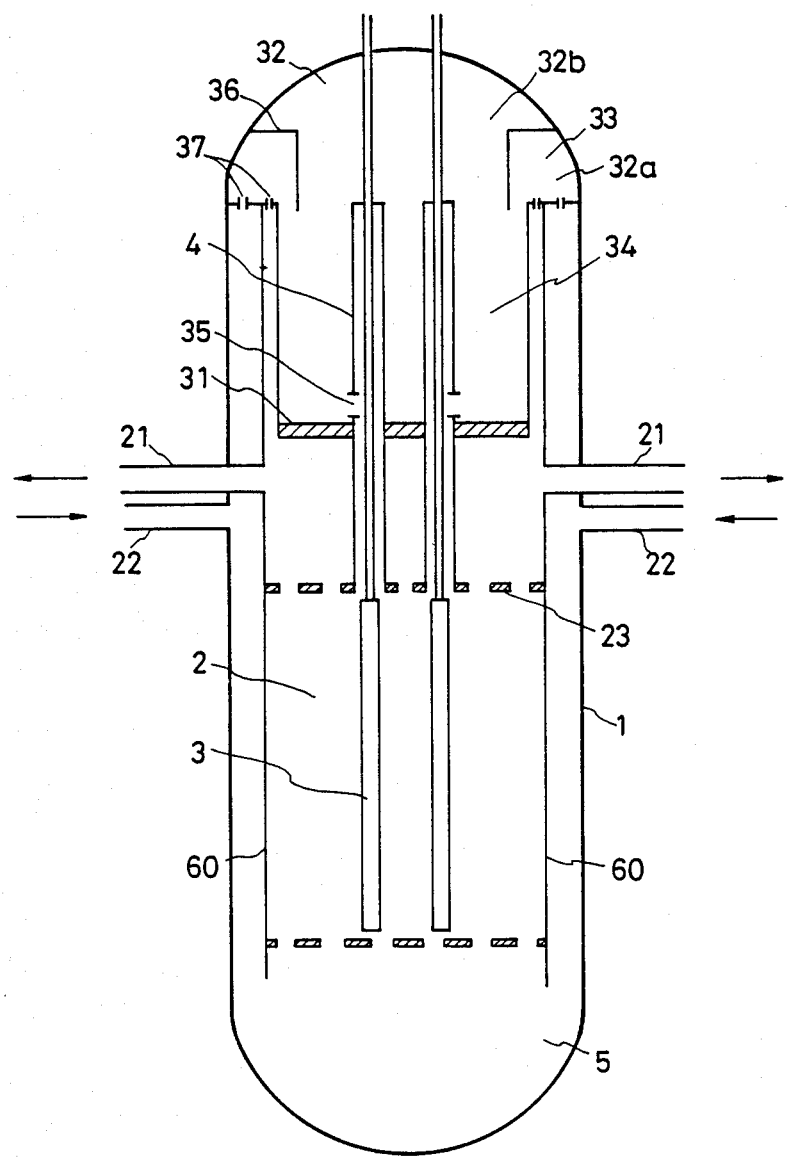
FIG. 6 is a schematic longitudinal section of a second embodiment of the present invention.

FIG. 6 shows a second embodiment of the present invention. In this embodiment, the present invention is applied to a pressurized water reactor. During a regular operation of a pressurized water reactor, the primary cooling water 5 supplied from cold legs 22 to a reactor vessel 1 is heated in a core 2 and heated therein. The heated cooling water is supplied to a vapor generator through hot legs 21, and the secondary cooling water is heated. The resultant cooling water is recirculated by a circulation pump to the cold legs 22 and core 2. In the pressurized water reactor, control rods 3 are inserted into the core 2 from the upper portion thereof, and control rod guide pipes 4 are provided above the core 2, a wide space extending above the core 2. Accordingly, this embodiment, in which a partition 31 is provided above the core 2, has a water storage container 32 formed by a part of the reactor vessel 1 and partition 31. The temperature of the primary cooling water 5 above the core 2 is about 320° C., and the cooling water in the water storage container 32 is heated and expanded by the heat transmitted thereto through the partition 31, to flow up, the resultant cooling water being cooled by the heat radiated from the upper surface of the portion of the reactor vessel 1 which is used also as the water storage container 32, to flow down, the natural convection thus occurring. Owing to this natural convection, the temperature in the water storage container 32 becomes uniform and reaches about 160° C. In this embodiment, this 160° C. cooling water is called a low-temperature coolant 34. The saturation pressure of the water of 160° C. is 6 ata. Unless the pressure in the reactor vessel 1 has become not higher than 6 ata., the boiling of the coolant 34 does not start. Therefore, this coolant 34 can be used satisfactorily as a low-temperature coolant. In the meantime, a very small quantity of the primary coolant 5 of about 280° C. which flows from the cold legs 22 into the reactor vessel 1 flows into the upper portion thereof through leakage ports 37 formed at the upper portions of shrouds 60. A high-temperature coolant chamber 32a is formed above the leakage ports 37 by a partition 36 which consists of a hollow double wall structure of a heat-insulating material. The primary coolant flowing from the leakage ports 37 into this chamber 32a is retained at about 280° C. therein to form a high-temperature coolant 33. The high-temperature coolant chamber 32a is communicated with a chamber 32b in which the low-temperature coolant is held. When an accident occurs in the nuclear reactor, the pressure in the reactor vessel decreases to cause the high-temperature coolant 33 to be flashed, and the low-temperature coolant 34 is injected into the core 2 by the expansion force generated due to the flashing of the coolant 33, in the same manner as in the embodiment shown in FIG. 1. The portions of th control rod guide pipes 4 which face the low-temperature coolant 34 in the lower portion of the water storage container 32 are provided with discharge ports 35, and the low-temperature coolant 34 is injected into the core through these discharge ports 35 and control rod guide pipes 4 owing to the flashing of the high-temperature coolant.

A period of time during which the pressure in the reactor vessel is not lower than 10 ata. is important for a core-cooling operation. It is necessary to set the conditions so that the low-temperature coolant 34 is not boiled at least 10 ata., and thereby prevent a decrease in the cooling effect of the low-temperature coolant. To meet these requirements, it is necessary that the temperature of the low-temperature coolant 34 be set to not higher than 180° C. In this embodiment, this temperature is about 160° C. as previously mentioned. In order that the injection of the cooling water into the core can be done even after the pressure in the reactor vessel has become not higher than 10 ata., it is possible to provide an embodiment in which a conventional emergency core cooling structure, which consists of a pump, an injection valve a check valve and an injection pipe, and the above-described structure according to the present invention are combined. Even in such an embodiment, the injection pressure of the pump can be reduced to around 10 ata. Therefore, an inexpensive pump can be used, and the cost of operating the emergency core cooling structure at a low pressure can be minimized. According to such an embodiment of the emergency core cooling structure, the flashing of the cooling water can be utilized to carry out a core-cooling operation for a short period of time when the pressure in the reactor vessel is high, and the pump to carry out a core cooling operation for a long period of time when the pressure in the reactor vessel is low.

The above-described embodiment has the following effects.

(1) The partition 31 can be formed by only closing the flow passages in the support plate in the pressurized water reactor, and the water storage container 32 the volume of which is about 40 m³ can thereby be formed. Even if the cooling water flowing out reversely from the leakage ports 37 is excluded from the 40 m³ of the cooling water, about 36 m³ (90% of the total quantity of the cooling water in the container 32) of the cooling water can be supplied to the core 2. A conventional emergency core cooling structure is provided as its parts with four 38 m³ pressure storage injectors. However, since the cooling water from this emergency core cooling structure is injected into the cold legs, the greater part of the cooling water flows out from a rift, and, therefore, the quantity of the cooling water flowing into the core is only 20-25% (i.e. around 38 m³×4×0.25=38 m³) of the total quantity thereof. On the other hand, in the embodiment of the present invention, 36 m³ of cooling water can be supplied to the core 2. Accordingly, the parts (four pressure storage injectors) in a conventional emergency core cooling structure can be eliminated, and the capacity of the structure can be minimized.

(2) Only the phenomena based on the natural law, which occur with no driving means used, are utilized in the same manner as in the embodiment of FIG. 1. Accordingly, a highly-reliable emergency core cooling structure can be obtained.

(3) In a conventional emergency core cooling structure, the low-temperature cooling water is supplied to the reactor vessel 1 through the cold legs 22. Therefore, when the reactor vessel 1 is cooled suddenly, a thermal impact occurs, so that the reactor vessel is damaged in some cases. On the other hand, according to the present invention, in which the cooling water has a comparatively high temperature of 160° C., and in which the cooling water is supplied directly to the core 2 to which no high pressure is applied, the damage to the structure can be prevented even when a thermal impact is imparted thereto.

The operation of the second embodiment of the present invention, which is shown in FIG. 6, will now be described in detail with reference to FIG. 7 and FIGS. 8a-8c.

The condition of the interior of the water storage container during a regular operation of the nuclear reactor is shown in FIG. 7. As previously described, the lower surface of the water storage container 32 is heated by the heat transmitted from the high-temperature (320° C.) primary coolant 5 in the portion of the interior of the reactor vessel which is above the core 2 thereto through the partition 31, and the heat is discharged from the upper surface of the portion of the reactor vessel 1 which is used also as the water storage container 32. Consequently, the natural circulation of cooling water occurs in the water storage container 32, and the temperature of the cooling water becomes uniform, the low-temperature coolant 34 of about 160° C. being formed. This temperature of the low-temperature coolant is determined by the ratio of the thermal resistance of the partition 31 to that of the upper surface of the reactor vessel 1. If it is desired to set the temperature of the low-temperature coolant 34 in a lower level, the partition 31 may be formed so that it has heat-insulating construction. There is a difference of 2.5 ata. between the pressure at the inlets (cold legs 22) of the reactor vessel 1 and that at the outlets (hot legs 21) thereof. If the leakage ports 37 are provided in the water storage container 32, a part of the about 280° C. primary coolant flows from the cold legs 22 into the high-temperature coolant chamber 32a in the reactor vessel 1, and leakage currents flowing from the upper portion of the core 2 to the hot legs 21 occurs. For example, if the cross-sectional area of flow passages in the leakage ports is 20 cm$^2$, the flow rate of the leakage currents is 25 kg/s. Accordingly, the rate of transmission of heat by the leakage currents becomes $7.4 \times 10^3$ kcal/s, which is 46 times as high as the total rate of transfer of the heat, which is transmitted from the partition 31 and radiated from the upper surface of the portion of the reactor vessel 1 which is used also as the water storage container 32, of $1.6 \times 10^2$ kcal/s. Therefore, the radiation of heat from the 280° C. leakage currents can be ignored, and the temperature of the cooling water on the inner side of the partition 36 is maintained at 280° C., the high-temperature coolant 33 being thereby formed. The flow rate of leakage currents of 25 kg/s is 0.06% of the total flow rate in the core of $4.1 \times 10^4$ kg/s, and the influence of this leakage current flow rate upon a regular operation of the nuclear reactor can be neglected.

The condition of the injection of cooling water after the occurrence of an accident in the nuclear reactor is shown in FIGS. 8a-8c. The pressurized water reactor is normally operated at about 160 ata. When a accident occurs in the nuclear reactor to cause the pressure in the reactor vessel to decrease to 65 ata., the high-temperature coolant 33 on the inner side of the partition 36 starts being flashed. Due to the expansion force of the coolant, the low-temperature coolant 34 in the water storage container 32 is injected directly into the core 2 through the discharge ports 35 and control rod guide pipes 4. Since the expanded high-temperature coolant 33 is lighter than the low-temperature coolant 34, it is collected in the upper portion of the interior of the water storage container 32. During this time, a part of the cooling water flows out from the leakage ports 37. However, the quantity of the cooling water flowing out from the leakage ports 37 is only several percent of that of the cooling water stored since the cross-sectional area of the leakage ports 37 is considerably smaller than that of the joint portion between the high-temperature coolant 33 and low-temperature coolant 34. When the vapor layer in the upper portion of the water storage container 32 is expanded due to the injection of the cooling water into the core 2 to reach the leakage ports 37, the vapor flows out from the leakage ports 37. Since the density of the vapor is low, the volume flow rate of the outgoing vapor increases, though the mass flow rate thereof is low. As shown in FIG. 3, the volume of the high-temperature coolant 33 increases suddenly when the pressure decreases, and, as shown in FIG. 4, the injection rate also increases in inverse proportion to the pressure. Accordingly, since a part of the vapor in the vapor layer in the upper portion of the water storage container 32 is taken out from the leakage ports 37, the expansion force of the cooling water at a low pressure can be lessened, so that the cooling water can be injected into the core at a substantially constant flow rate.

Figure 9:
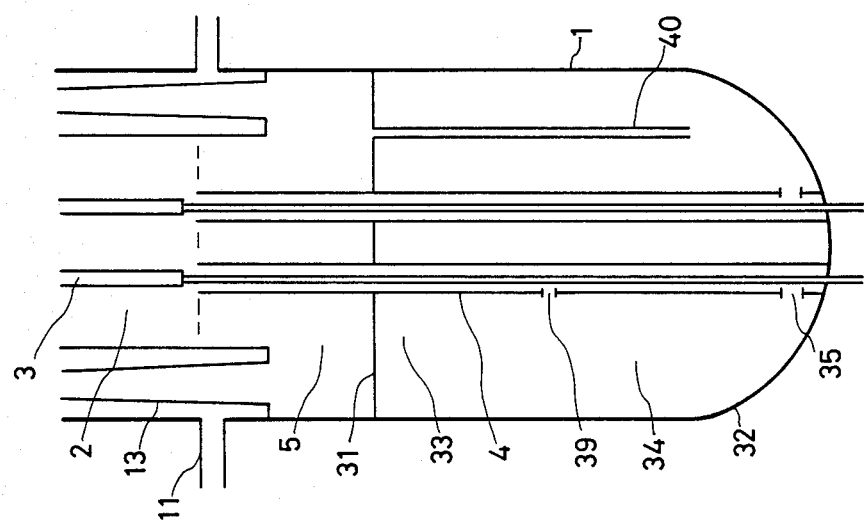
FIG. 9 is a schematic section of a water storage container in a third embodiment of the present invention.

An embodiment, in which this method of taking out a part of the vapor to enable an increase in the injection rate under the low-pressure conditions to be lessened as mentioned above is applied to the boiling water reactor shown in FIG. 1, is shown in FIG. 9 (third embodiment). Owing to the heat transmitted from the high-temperature primary coolant 5 and through the partition 31, a high-temperature coolant 33 is formed in the upper portion of the water-storage container 32, and, owing to the heat radiated from the reactor vessel 1, a low-temperature coolant 34 in the lower portion thereof, in the same manner as previously described.

Figure 10:
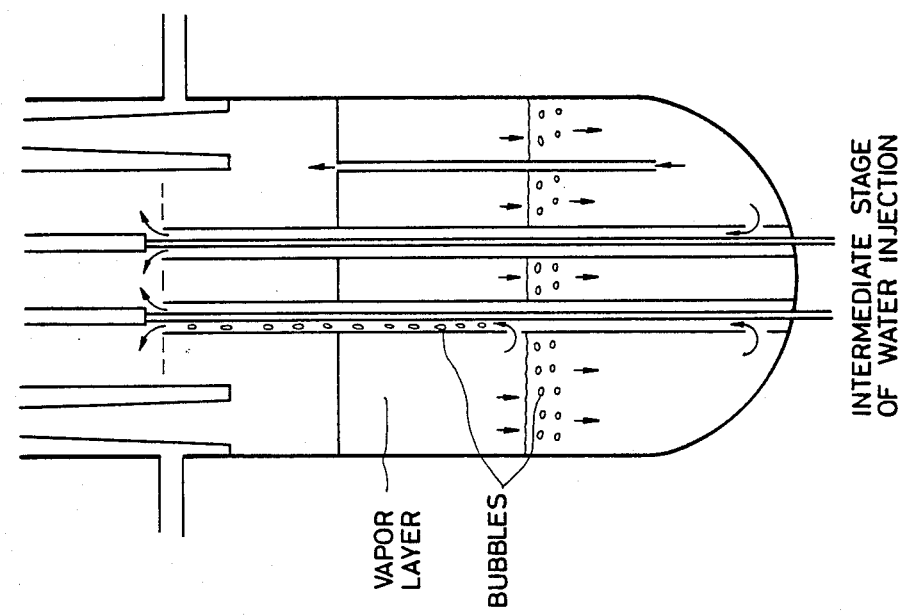
FIG. 10 is a schematic section illustrating the operation of the embodiment of FIG. 9.

The characteristics of this embodiment reside in that a leakage port 39 is provided in a control rod guide pipe 4; or a vapor vent pipe 40 is provided. When an accident occurs in the nuclear reactor, the high-temperature coolant 33 is flashed and the low-temperature coolant 34 is supplied to the core 2 through the discharge ports 35 and control rod guide pipes 4 due to the expansion force of the flashed coolant 33. During this time, a vapor layer is formed in the upper portion of the water storage container 32. When the lower end of this vapor layer has reached the leakage port 39, a part of the vapor in this expanded vapor layer flows out through the leakage port 39 and control rod guide pipes 4 as shown in FIG. 10, so that an increase in the expansion force is lessened. Accordingly, the flow rate of the low-temperature coolant 34 injected into the core 2 is made constant. If the leakage port 39 is provided in a control rod guide pipe 4, a part of the vapor in the vapor layer is discharged into the core 2. When it is undesirable that the vapor be discharged into the core 2, the vapor vent 40 may be provided so as to discharge the vapor into the portion of the reactor vessel which is below the core 2. In this case, a part of the low-temperature coolant 34 flows out to the portion of the reactor vessel which is below the core 2 through the vapor vent pipe 40. The cross-sectional area of the flow passage in this vapor vent pipe 40 may be small, and the flow rate of the coolant 34 therein in this case is negligibly low. According to this embodiment, the expansion force of the cooling water, i.e. the injection rate thereof can be regulated freely by regulating the height and diameter of the leakage port 39 or vapor vent pipe 40. For example, when it is desired that the injection rate be iept constant with respect to a decrease in the pressure, the height and diameter of the leakage port 39 or vapor vent pipe 40 may be determined so that the volume ratio of the high-temperature cooling water, which is shown in FIG. 3, varies in inverse proportion to the pressure.

According to the present invention, the injection starting pressure, injection rate and injection characteristics can be set as necessary in accordance with the temperature of the high-temperature coolant 33, a ratio of the volume of the high-temperature coolant 33 to that of the low-temperature coolant 34, and the height and diameter of the leakage port 39 or vapor vent pipe, respectively.

In the embodiments of the present invention shown in FIGS. 1, 4, and 9, a part of the reactor vessel is used also as a water storage container. This water storage container can also be provided on the outer side of the reactor vessel.

Figure 11:
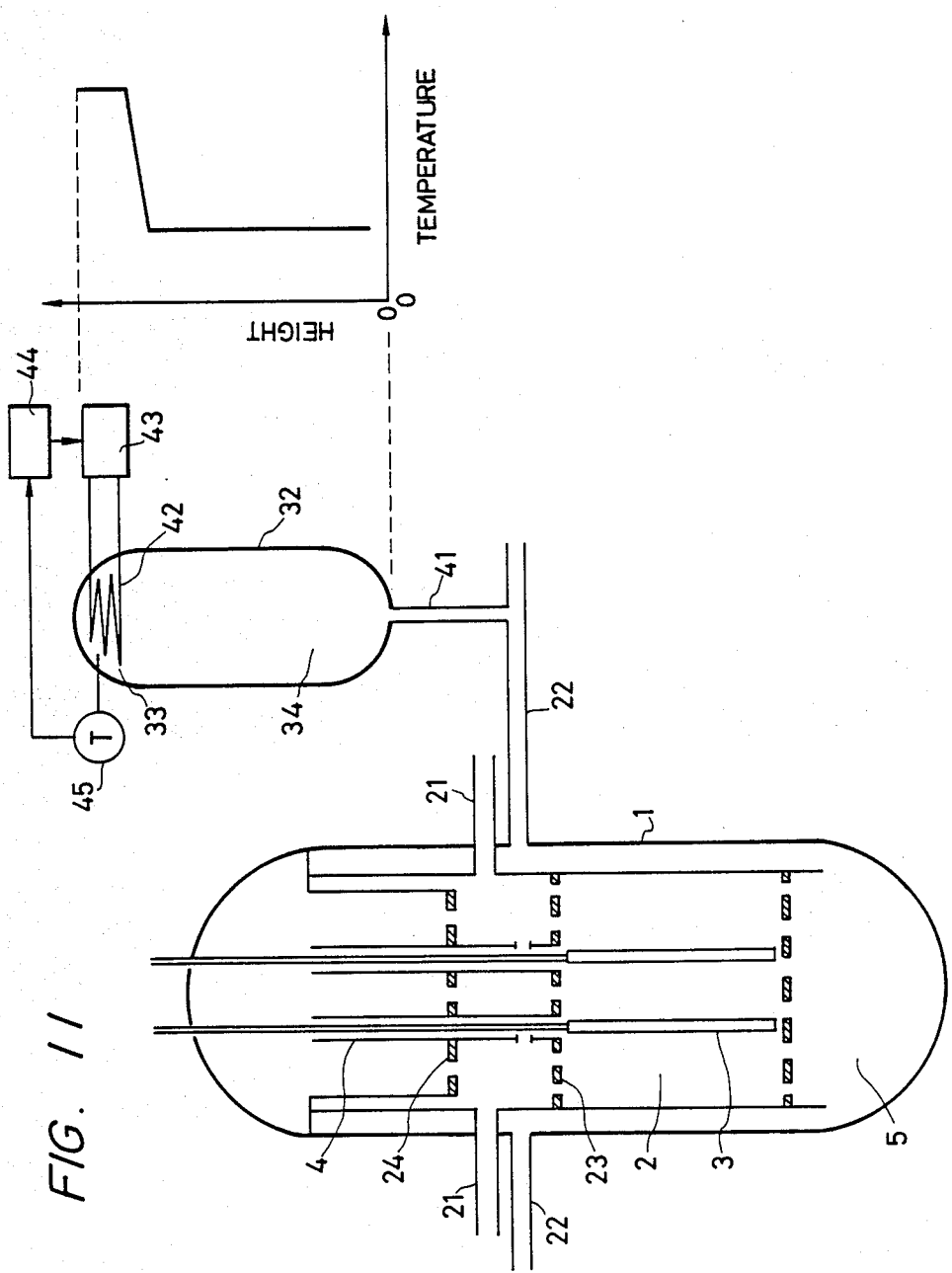
FIG. 11 is a system diagram of a fourth embodiment of the present invention.
Figure 13:
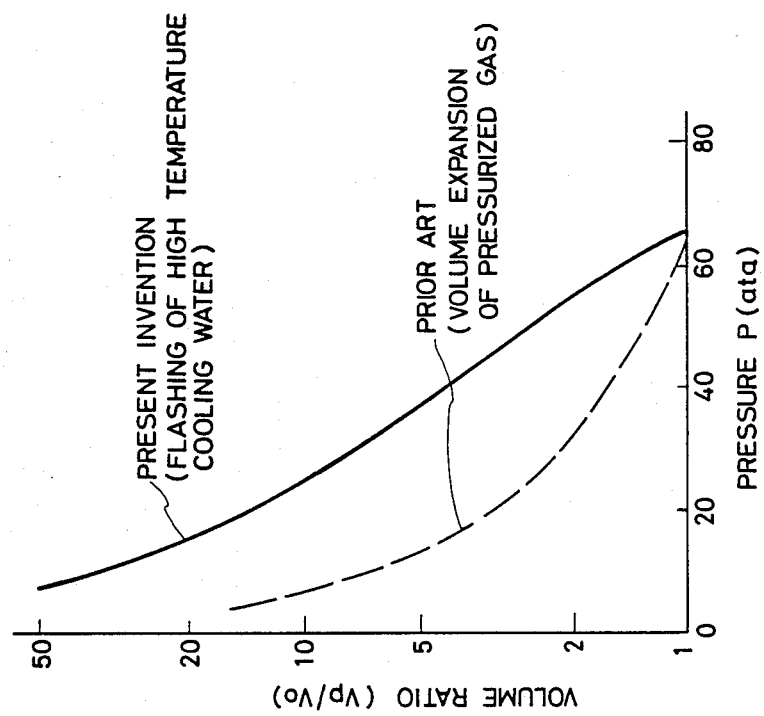
FIG. 13 is a graph comparing the structure of FIG. 12 with a structure according to the present invention with respect to the expansion of the cooling water.
Figure 12:
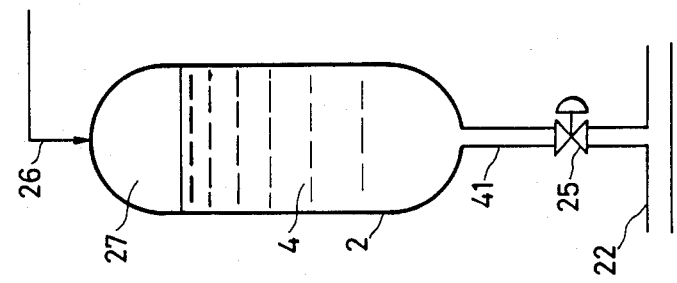
FIG. 12 is a sectional view of a conventional emergency core cooling structure of a pressure storage injection system.

FIG. 11 shows a fourth embodiment of the present invention. In this embodiment, the present invention is also applied to a pressurized water reactor, in which a water storage container 32 is provided on the outer side of a reactor vessel 1. Referring to the drawing, reference numeral 2 denotes a core, 3 control rods, 4 control rod guide pipes, 5 a primary coolant, 21 hot legs, 22 cold legs, 23 a core plate, and 24 a support plate. In this embodiment, the upper portion alone of the cooling water in the water storage container 32 is heated by a heater 42 to form a high-temperature coolant 33 in the upper portion of the water storage container 32. The temperature of the high-temperature coolant 33 is set to a predetermined level by detecting the temperature thereof by a temperature detector 45 and controlling an output from a heater power source 43 by a temperature controller 44. Since the heat conductivity of the cooling water is low as previously mentioned, the cooling water in the lower portion, in which the heater 42 is not provided, of the water storage container 32 is maintained at a low temperature to form a low-temperature coolant 34. When an accident occurs in the nuclear reactor, the high-temperature coolant 33 is flashed in the same manner as in the embodiments of FIGS. 1 and 6, and the low-temperature coolant 34 is supplied to the core 2 through an injection pipe 41 and a cold leg 22 owing to the expansion force of the high-temperature coolant 33. The injection pipe 41 may be connected to a hot leg 21 so as to supply the low-temperature coolant 34 to the core 2 therethrough. As shown in FIG. 12, a conventional pressure storage water injector has a low-temperature coolant 34 in a water storage container 32, and a pressurized gas 27 (for example $N_2$), which is fed from a pressurized gas supply system 26, is sealed in the upper portion of the water storage container 32. When an accident occurs in the nuclear reactor to cause the pressure in the reactor vessel to decrease to a level not higher than a predetermined level, a water injection valve 25 is opened to supply the low-temperature coolant 34 to the core through a water injection pipe 41 and a cold leg 22 by the pressurized gas 27. In this case, the expansion of the pressurized gas is as small as 20–25% as shown in FIG. 13, as compared with the expansion of the high-temperature cooling water occurring during the flashing thereof according to the present invention. Therefore, it is necessary that the capacity of the portion of the water storage container which contains the pressurized gas 27 be set to a high level. This causes the dimensions of the water storage container to increase.

The fourth embodiment described above of the present invention has the following effects.

(1) This embodiment is provided with no driving means, such as a pump and a valve, and has a high reliability.

(2) The high-temperature cooling water expands, when it is flashed, 4–5 times the pressurized gas utilized in the conventional pressure storage water injector. Accordingly, if a water storage container, the capacity of which is equal to that of the corresponding part of the conventional pressure storage water injector, is used in the present invention, a large quantity of low-temperature cooling water can be stored.

(3) Since the water storage container is provided on the outer side of the reactor vessel, the water storage capacity thereof is not limited. Since a heater is used to heat the high-temperature coolant, the temperature of the high-temperature coolant can be arbitrarily selected. Therefore, even if the pressure in the reactor vessel is in around the level of the pressure therein attained during a normal operation of the nuclear reactor, the injection of the low-temperature coolant into the core can be done, and the injection starting pressure can be set to an arbitrary level.

Figure 14:
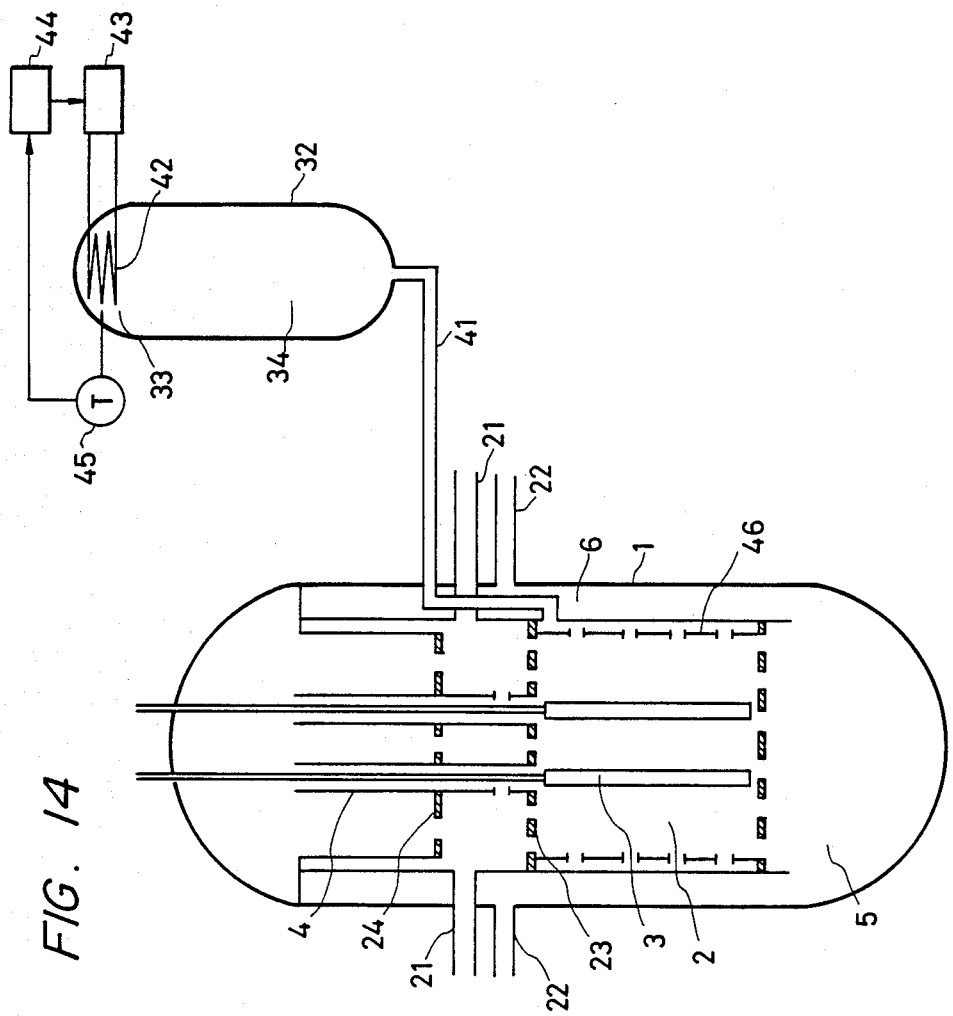
FIG. 14 is a system diagram of a fifth embodiment of the present invention.

FIG. 14 shows a fifth embodiment of the present invention. When a coolant is supplied directly to the core as described in the previous paragraph with reference to the embodiment of FIG. 5, the coolant flows into the core more effectively than in the case where a low temperature coolant is injected into the core through a cold leg. In this fifth embodiment, the embodiment of FIG. 11 is modified by inserting the injection pipe 41 into the interior of the reactor vessel 1 to enable the low-temperature coolant 34 in the water storage container 32 to be injected into the core 2 directly via a baffle plate 46 which consists of a perforated plate. According to the fifth embodiment, the injected coolant does not flow out from a rift in a pipe through a down-comer 6, and the whole quantity of the low temperature coolant 34 in the water storage container 32 can be injected into the core 2. Therefore, the water storage container can be miniaturized.

Figure 15:
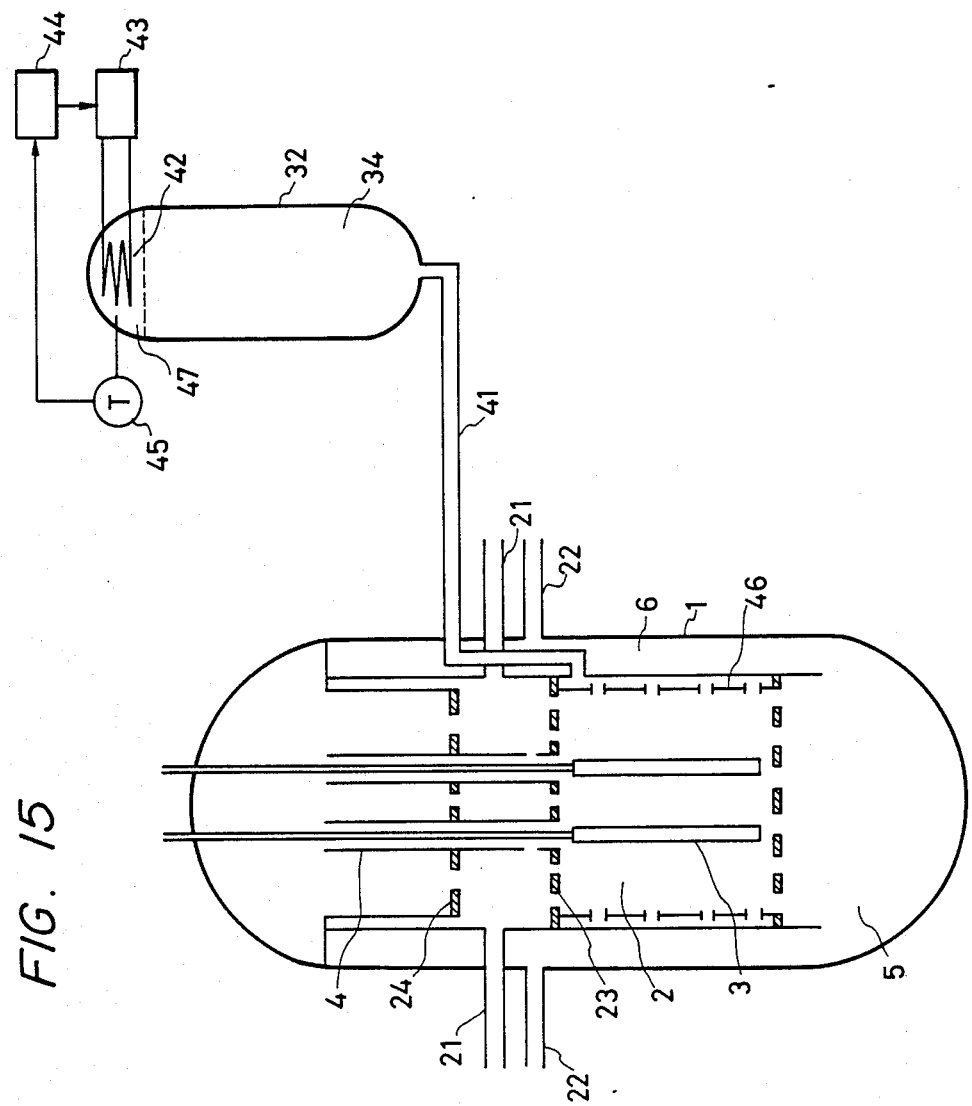
FIG. 15 is a system diagram of a sixth embodiment of the present invention.

In each of the embodiments of the present invention shown in FIGS. 1, 6, 9, 11 and 14, a high-temperature coolant serving as a driving power source for injecting cooling water into the core is formed by heating a primary coolant or a substance (cooling water) identical therewith. A substance the density and boiling starting temperature of which are lower than those of the primary coolant can also be used as a high-temperature coolant. FIG. 15 shows a sixth embodiment of the present invention, which is formed by modifying a part of the embodiment shown in FIG. 14. The sixth embodiment is characterized in that a substance different from a primary coolant 5 is employed as a high-temperature coolant 47 and sealed in a water storage container 32. For example, if Flon R152 ($CHF_2CH_3$) is used as the high-temperature coolant 47, it gathers in the upper portion of the water storage container 32 and is not mixed with the low-temperature coolant 34 because this high-temperature coolant has a density of 0.36 g/cm$^3$ (45 ata) lower than that of the low-temperature coolant of 1.0 g/cm$^3$, and weight smaller than that thereof. Even if this high-temperature coolant 47 should enter the reactor vessel 1, it wholly turns into vapor under the normal-temperature atmospheric pressure conditions, so that it can be separated and recovered easily. Moreover, the saturation temperature of the coolant 47 is as low as 115° C. at 45 ata. Accordingly, the capacity of the heater 42 can be minimized, and a large expansion force of the coolant can be obtained even at a low pressure. Therefore, according to this embodiment, the present invention can be applied to a nuclear reactor operated at a low pressure, and the capacity of the heater can be reduced.

Figure 16:
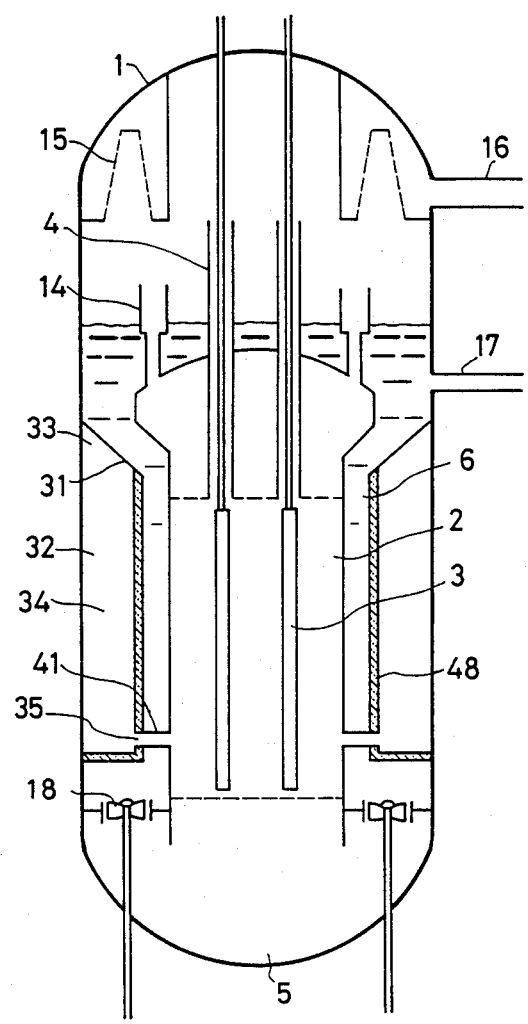
FIG. 16 is a schematic longitudinal section of a seventh embodiment of the present invention.

FIG. 16 is a longitudinal section of a seventh embodiment of the present invention. In this embodiment, the present invention is applied to a boiling water reactor, which uses internal pumps 18 for the recirculation of a primary coolant 5 and has control rods 3 inserted into a reactor vessel 1 from the upper portion thereof. The characteristics of the internal pump type nuclear reactor reside in that, since a large-diameter recirculation pipe is not provided, the quantity of an out-flow per unit time of the primary coolant 5 after the occurrence of breakage of a pipe is small, whereby the capacity of the emergency core cooling structure can be reduced. In the internal pump type nuclear reactor, impellers for the internal pumps 18 are provided, so that the volume of a down-comer 6 increases. Therefore, in this embodiment, a partition 31 is provided in the down-commer 6 to form a water storage container 32 by the partition 31 and a part of the reactor vessel 1. In this case, the contact surface area of the partition 31 and primary coolant 5 is large, and the coolant in the water storage container 32 is apt to be heated to a high temperature. To prevent this inconvenience, a heat-insulating layer 48 is provided on the partition 31 except the upper portion thereof. A heat-resisting ceramic material, glass cotton and a heat-resisting plastic can be used to make the heat-insulating layer 48. In the upper portion of the water storage container 32, a high-temperature coolant 33 is formed owing to the heat transmitted from the high-temperature primary coolant 5, and, in the lower portion thereof, the coolant is maintained at a low temperature owing to the heat-insulating effect of the heat-insulating layer 48 and the heat radiated from the reactor vessel 1, so that a low-temperature coolant 34 is formed therein. When an accident occurs in the nuclear reactor, the pressure in the reactor vessel decreases to cause the high-temperature coolant 33 in the water storage container 32 to be flashed. Owing to the expansion force of the boiled coolant 33, the low-temperature coolant 34 is supplied to the core 2 through the discharge ports 35 and injection pipes 41. According to this embodiment, a driving means is not provide as in the previously-described embodiments. Therefore, an emergency core cooling structure having a high reliability and capable of being manufactured at a low cost can be obtained.

Figure 17:
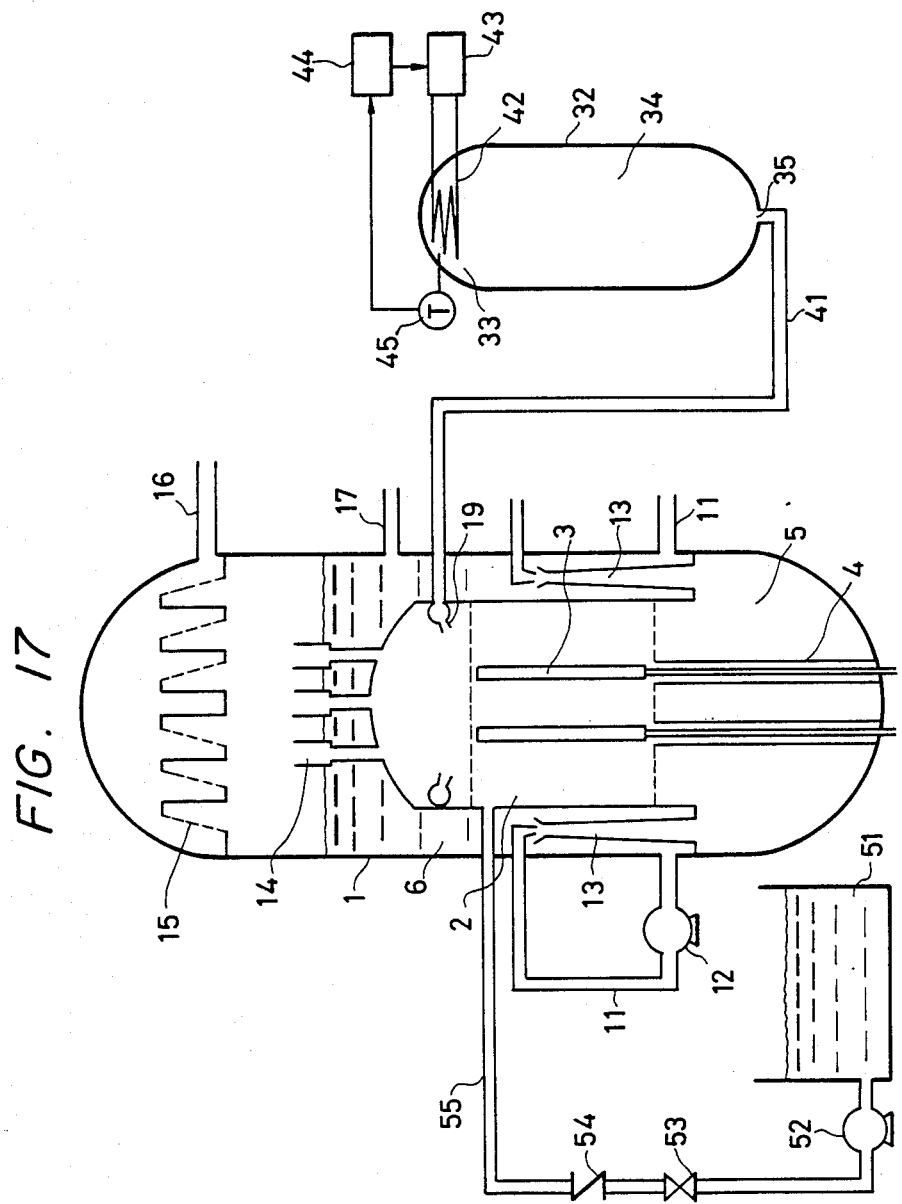
FIG. 17 is a system diagram of an eighth embodiment of the present invention.

FIG. 17 is a longitudinal section of an eighth embodiment. In this embodiment, a water storage container 32 is provided on the outer side of a reactor vessel 1, and an emergency core cooling structure according to the present invention and a conventional emergency core cooling structure are combined. These constitute the characteristics of this embodiment. Namely, the coolant in the upper portion only of the water storage container 32 is subjected to heating and a temperature control operation by using a heater 42, a temperature detector 45, a temperature controller 44 and a power source 43 for the heater 42 to form a high-temperature coolant 33. During a normal operation of the nuclear reactor, the portion of the interior of the reactor vessel which is above the core 2 is filled with a mixed phase of the vapor and cooling water. However, since the discharge port 35 of the water storage container 32 is lower than a nozzle 19, the vapor in the core does not flow into the water storage container 32. When accident occurs in the nuclear reactor, the low-temperature coolant 34 is diffused in an atomized state from the nozzle 19 into the upper portion of the core 2 through the discharge port 35 and injection pipe 41 owing to the flashing of the high-temperature coolant 33. When the pressure in the reactor vessel 1 has further decreased, an emergency core cooling structure consisting of a pump 52, an injection pump 53, a check valve 54 and an injection pipe 55, and having the same construction as a conventional structure of this kind is operated to supply the cooling water in a suppression pool 51 into the core 2. According to this embodiment described above, the coolant in the emergency core cooling structure, in which the flashing of the high-temperature coolant is utilized, i.e. the coolant in the water storage container 32 is injected into the core 2 to cool the same (for a short period of time) during an early period of time which is immediately after the occurrence of an accident, in which the pressure in the reactor vessel is high, and the coolant in the emergency core cooling structure of the construct on identical with the construction of a conventional structure of this kind, i.e. the coolant in the suppression pool 51 is supplied to the core to cool the same (for a long period of time) during a period of time which is after the occurrence of a great decrease in the pressure in the reactor vessel. According to this embodiment, the effective and long-term cooling of the core can be done. In the emergency core cooling structure in this embodiment, the injection of cooling water is done at a high pressure by a cooling structure utilizing the flashing of a high-temperature coolant. Accordingly, the cooling structure utilizing the pump 52 may be so designed that only the injection of cooling water at a low pressure can be done. This enables the capacity and manufacturing cost of the pump 52 to be reduced. In each of the previously-described embodiments, the emergency core cooling structure, the construction of which is identical with that of a conventional structure of this kind, can also be used in combination with the emergency core cooling structure used therein, in the same manner as in the eighth embodiment.

According to each of the above-described embodiments of the present invention, the following effects can be obtained.

(1) A high-temperature coolant and a low-temperature coolant are held in a water storage container. When an accident occurs in the nuclear reactor, the pressure in the reactor vessel decreases to cause the high-temperature coolant to be flashed. The expansion force of the high-temperature coolant is utilized as the driving power source to supply the low-temperature coolant to the core. Therefore, a highly-reliable emergency core cooling structure capable of being used without causing a decrease in the core cooling performance thereof and having no driving means can be obtained.

(2) Since the phenomena based on the natural law, such as the flashing of a high-temperature coolant, transmission of heat and radiation of heat are utilized, a simply-constructed, inexpensive emergency core cooling structure can be provided.

(3) The injection starting pressure can be regulated by regulating the temperature of the high-temperature coolant, and the injection rate by regulating the volume of the high-temperature coolant. An emergency core cooling structure having a high degree of freedom of designing the same can be provided.

(4) What is flashed is the high-temperature coolant alone and the low-temperature coolant injected into the core remains to be in the form of a liquid. Therefore, the core can be cooled efficiently.

What is claimed is:
1. A nuclear reactor comprising:
a nuclear reactor pressure vessel containing nuclear fuel and cooling water;
a liquid storage container containing an emergency cooling liquid so as to separate it from said cooling water, and keeping the temperature of an upper part of said emergency cooling liquid higher than that of a lower part thereof, the lower part of said emergency cooling liquid being lower in temperature than the cooling water in said pressure vessel;
means, substantially free from any movable parts, for always communicating the lower temperature region of said liquid storage container and a reactor core region; and
wherein said liquid storage container is provided outside said pressure vessel, and a heater for heating the emergency cooling liquid is provided in an upper portion in said liquid storage container,
whereby when the cooling water in said pressure vessel flows out thereby to cause the pressure of said pressure vessel to decrease, the emergency cooling liquid in the high temperature region of said liquid storage container boils to generate vapor, the pressure of said vapor depresses the low temperature emergency cooling liquid in the lower part of said liquid storage container and supplies said emergency cooling liquid to said reactor core region of said pressure vessel through said communicating means.

2. A nuclear reactor according to claim 1, wherein the emergency cooling liquid in the high temperature region of said liquid storage container is kept at a temperature at which boiling starts under a pressure of 20-65 ata, and the emergency cooling liquid in the low temperature region of said liquid storage container is kept at a temperature at which boiling starts under a pressure of less than 10 ata.

3. A nuclear reactor according to claim 1, wherein the emergency cooling liquid in the high temperature region of said liquid storage container is kept at a temperature of 210°-280° C. and in the low temperature region at a temperature below 180° C.

4. A nuclear reactor according to claim 1, wherein a water injection pipe is provided for fluidly connecting the lower part of said liquid storage container and a cold leg connected to said pressure vessel.

5. A nuclear reactor according to claim 1, wherein a water injection pipe is provided for fluidly connecting the lower part of said liquid storage container and a hot leg connected to said pressure vessel.

6. A nuclear reactor according to claim 1, wherein a water injection pipe is provided for fluidly connecting a lower part of said liquid storage container and said reactor core in said pressure vessel, and a baffle plate having a plurality of holes is provided on the outer peripheral portion of said reactor core, whereby the emergency cooling liquid from said water injection pipe is injected into said reactor core through said baffle plate.

7. A nuclear reactor according to claim 1, wherein material used as a high temperature region emergency cooling liquid in said liquid storage container is one whose density is smaller than water and whose boiling point is lower than water.

8. A nuclear reactor according to claim 1, further comprising an emergency core cooling means having a suppression pool, a pump and a valve.

* * * * *